(12) United States Patent
Hitch et al.

(10) Patent No.: US 8,850,647 B2
(45) Date of Patent: Oct. 7, 2014

(54) COMPOSITE CUSHION WITH COMPRESSION MODULATED VALVE AND VALVE ASSEMBLY THERE FOR

(75) Inventors: Philip R. Hitch, Seattle, WA (US); L. Paul Nickerson, Seattle, WA (US)

(73) Assignee: Cascade Designs, Inc., Seattle, WA (US)

( * ) Notice: Subject to any disclaimer, the term of this patent is extended or adjusted under 35 U.S.C. 154(b) by 0 days.

(21) Appl. No.: 12/383,108

(22) Filed: Mar. 18, 2009

(65) Prior Publication Data

US 2009/0235460 A1 Sep. 24, 2009

Related U.S. Application Data

(63) Continuation of application No. PCT/US2007/020309, filed on Sep. 18, 2007.

(60) Provisional application No. 60/845,640, filed on Sep. 18, 2006.

(51) Int. Cl.
*A47C 16/00* (2006.01)

(52) U.S. Cl.
USPC .......... 5/655.3; 5/654; 5/709; 251/7

(58) Field of Classification Search
USPC .......... 5/655.3, 706, 644, 413 AM, 708–713, 5/654; 251/7, 294; 297/452.41
See application file for complete search history.

(56) References Cited

U.S. PATENT DOCUMENTS

| | | | |
|---|---|---|---|
| 4,025,974 A | 5/1977 | Lea et al. | |
| 4,044,989 A | 8/1977 | Basel et al. | |
| 4,120,061 A | * 10/1978 | Clark | 5/710 |
| 4,149,919 A | 4/1979 | Lea et al. | |
| 4,261,776 A | 4/1981 | Lea et al. | |
| 4,624,877 A | 11/1986 | Lea et al. | |
| 5,033,133 A | 7/1991 | Nissen | |

(Continued)

FOREIGN PATENT DOCUMENTS

| | | |
|---|---|---|
| JP | 10-043253 | 2/1998 |
| KR | 10-0564796 B1 | 3/2006 |
| WO | 98/08011 A1 | 2/1998 |
| WO | 99/01687 A1 | 1/1999 |

OTHER PUBLICATIONS

PCT International Search Report from International Application No. PCT/US2007/020309 dated Mar. 12, 2008.

*Primary Examiner* — Robert G Santos
*Assistant Examiner* — Nicholas Polito
(74) *Attorney, Agent, or Firm* — Sound Intellectual Property PLLC

(57) ABSTRACT

Valve assemblies optionally with inflatable bodies for modulating fluid expulsion from an inflatable body, without active user participation. Valve assemblies include, in separate components or in integrated form, a vent body defining an external orifice, an internal orifice in fluid communication with the external orifice, and an inflatable body interface. Extending from the internal orifice is a collapsible, hollow elongate member defining longitudinal and lateral axes. Sealing closure of the elongate member, which is preferably constructed from a resilient material, results from application of generally opposing mechanical forces across a lateral surface of the elongate member. Compression localizing members may be used proximate to the elongate member to increase closure performance. In addition, performance parameters can be varied by modifying the physical characteristics of the compression members (height, upper surface area, lower surface area, composition, density, use of localizing ridges, etc.) as well as locations of the compression members (proximity to other compression members, distribution relative to the cushion geometry, etc.).

24 Claims, 4 Drawing Sheets

(56) References Cited

U.S. PATENT DOCUMENTS

| | | | |
|---|---|---|---|
| 5,152,018 A | 10/1992 | Lea | |
| 5,207,409 A * | 5/1993 | Riikonen | 251/7 |
| 5,814,004 A | 9/1998 | Tamari | |
| 6,164,564 A * | 12/2000 | Franco et al. | 239/284.1 |
| 6,269,504 B1 * | 8/2001 | Romano et al. | 5/690 |
| 6,715,174 B2 * | 4/2004 | Tsai | 5/709 |

\* cited by examiner

COMPOSITE CUSHION WITH COMPRESSION MODULATED VALVE AND VALVE ASSEMBLY THERE FOR

BACKGROUND OF THE INVENTION

Description of the Prior Art

In the field of cushion technology particularly for human support, achieving proper support characteristics is considered important. For medical applications, proper support characteristics is paramount. Various means have been employed to provide suitable combinations of materials and approaches to yield the desired results of proper support, performance, function, pricing and usability. Some cushions rely solely on mechanical support technology, e.g., the exclusive use of compressive material such as foam. Other cushions rely solely on pneumatic support technology, e.g., inflatable bladders. And, still other cushions rely upon a combined approach.

For applications that involve a pneumatic approach, control over the inflation and deflation aspects of the apparatus is desired, and to this end valve assemblies are used. Using air as the means to adjust the depth of immersion of a user into a cushion, a valve is commonly opened to release air within the cushion internal volume. Once the desired level of immersion has been achieved, the user will close the valve, thereby resealing the internal volume.

More progressive valve assemblies have also been used. Cascade Designs, Inc., assignee of the disclosed invention, integrates a preset valve assembly in its Zoid PSV™ wheelchair cushion. The valve assembly releases air to immerse the user in the foam, which conforms to the user and distributes the user's weight over the surface of the cushion. When the PSV senses that enough air has been released, it automatically shuts off the flow of air for optimal pressure distribution. However, the user must still initially open the valve before inflation can take place or before adjustment, and must close it after use.

SUMMARY OF THE INVENTION

The present invention is directed to valve assemblies and inflatable bodies using the same. Embodiments of the invention allow a user to modulate the volume of fluid escapement from an inflatable body and/or establish a general degree of pressurization within the inflatable body, without active participation. Such a feature will find particular relevance with mobility impaired individuals and in applications wherein manual or interactive adjustment of volume and/or pressure within the inflatable body is undesirable or impossible.

As used herein, the term "fluid" comprises both gasses and liquids, although in practical applications the working fluid is a gas, and particularly air. Therefore, the term "fluid" will generally be used unless the context of the disclosure benefits from an alternative meaning. Any reference to "gas" or "air" is intended to be synonymous with the term "fluid" as defined above, unless noted otherwise.

Valve assembly embodiments of the invention comprise, in separate components or in integrated form, a vent body defining an external orifice, an internal orifice in fluid communication with the external orifice, and an inflatable body interface. The inflatable body interface is intended to provide suitable means for incorporating the valve assembly in a fluid impervious sealing arrangement with the inflatable body. Therefore, if the inflatable body is otherwise fluidly sealed from the environment, the external orifice to internal orifice is the only effective fluid conduit to or from an internal volume or chamber defined by the inflatable body.

Extending from the structure defining the internal orifice is a collapsible, hollow elongate member defining longitudinal and lateral axes. In many respects, the elongate member functions similar to a duckbill valve. However, unlike a duckbill valve, the elongate member is normally open, thus providing a fluid conduit between the external orifice and the distal end thereof. Furthermore, unlike a duckbill valve, closure of the elongate member results only from application of generally opposing mechanical forces across the lateral surface of the elongate member in contrast to pressure differentials. In the absence of such generally opposing mechanical forces, the elongate member remains in a state that permits fluid transport from the distal end thereof to the proximal end thereof, and vice versa.

When integrated into an inflatable body, a semi-sealed structure results. In particular, fluid is at all times available for ingress into the chamber defined by the panels comprising the inflatable body as long as fluid pressure in the chamber is equal to (net fluid exchange) or less than (net fluid fill) the environment. Should the chamber fluid pressure exceed the environment, fluid is expelled from the chamber through the elongate member and out the external orifice. This fluid expulsion continues as long as the chamber fluid pressure exceeds the environmental fluid pressure until generally opposing mechanical forces are presented to at least a portion of the elongate member along the longitudinal axis and substantially across the lateral axis thereof, or there is no more fluid left to expel. These forces, as previously noted, cause at least that portion of the elongate member to collapse, thereby preferably establishing a fluid impervious seal. As long as the generally opposing mechanical forces are present, the cushion is in an iso-fluid state wherein the quantity of fluid in the chamber remains constant.

While an increase in the generally opposing mechanical forces will only result in either a decrease in the volume of the inflatable body, or an increase in the chamber pressure (if the inflatable body includes tensile elements that restrain body deformation), removal of such forces will permit the valve assembly to once again establish fluid communication between the chamber and the environment, and introduce fluid into the inflatable body if the chamber pressure is less than the environment.

The elongate body is preferably constructed from a resilient material that will predictably deform upon application of suitable opposing mechanical forces and recover its resting state shape upon removal of such forces. Because the elongate body is a hollow body, the internal surface thereof may be treated, coated, or subject to lamination with materials that enhance the performance and/or operating characteristics of the body. Thus, the elongate member may be constructed from suitable thin wall PVC while the internal surface has a urethane layer, which establishes a resilient seal when subject to compression. It is also within the scope of the invention if embodiments thereof have a removable liner within the elongate body, e.g., a removable urethane liner concentrically disposed within the PVC liner. And while there is no requirement for geometric shape (cross section) of the elongate member, preferably an elliptical or ovular shape is used.

When incorporated into an inflatable body, such as those incorporating tensile elements which resist uncontrolled dimensional distortion of the body, placement of the elongate member becomes important. In those applications wherein control over immersion is critical, correct placement of the elongate member will ensure that it will encounter mechanical compression imparted by a portion of the user's body, which preferably correlates with a desired level of support. Variables that affect the time of elongate body collapse include the applied pressure, the location of pressure versus the location of elongate member (vector distribution of forces), the stiffness of the elongate member, the geometry of the elongate member, etc.

To ensure proper and predictable application of generally opposing mechanical forces, structure can be incorporated into either the elongate member or preferably the inflatable body. By establishing compression localizing members proximate to the elongate member, a greater level of valve assembly performance certainty can be achieved. Thus, such opposing compression members localize otherwise distributed forces to operable portions of the elongate member. In addition, performance parameters can be varied by modifying the physical characteristics of the compression members (height, upper surface area, lower surface area, composition, density, use of localizing ridges, etc.) as well as locations of the compression members (proximity to other compression members, distribution relative to the cushion geometry, etc.).

In addition to the foregoing, the skilled practitioner will appreciate that the invention disclosed herein may also be applied to conventional inflatable bodies (whether self-inflating or not), or conventional externally operable conduit blocking means such as screw valves or the like can be used in addition to the internal sealing means disclosed herein.

DESCRIPTION OF THE INVENTION EMBODIMENTS

The following discussion is presented to enable a person skilled in the art to make and use embodiments the invention. Various modifications to the embodiments will be readily apparent to those skilled in the art, and the generic principles herein may be applied to other embodiments and applications without departing from the spirit and scope of the invention as defined by the appended claims. Thus, the invention is not intended to be limited to the embodiments shown, but is to be accorded the widest scope consistent with the principles and features disclosed herein.

Figure 1:
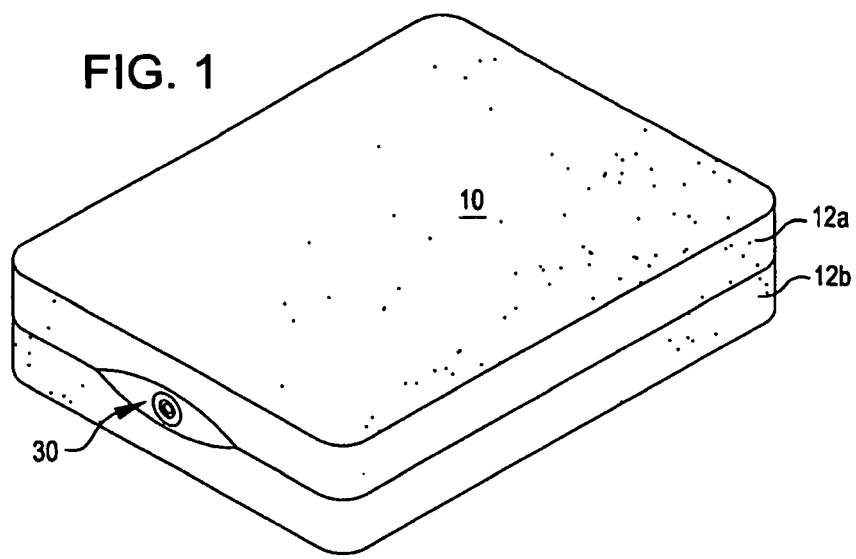
FIG. 1 is a perspective view of a valve assembly embodiment within a first inflatable body embodiment where an elongate member is shown in phantom.

Turning then to the several figures wherein like parts are identified by like numerals, and more particularly to FIG. 1, self-inflating cushion 10 is shown in perspective. Cushion 10 comprises a substantially fluid/gas impervious enclosure, which comprises panels 12a and 12b, and expanded foam core 14, all of which are preferably constructed according to the methods disclosed in U.S. Pat. Nos. 4,025,974, 4,149,919, 4,261,776 and 4,624,877, as well as similar patents owned by Cascade Designs, Inc., the disclosures of which are incorporated herein by reference. Thus, panels 12a and 12b are sealed along their common perimeter, enclosing foam core 14. The resulting structure defines a chamber occupied by foam core 14 that but for the presence of valve assembly 30, would be sealed to the external environment. Therefore, the only means of fluid ingress into and egress from the foam core chamber is via valve assembly 30.

The inflatable bodies disclosed in these noted patents use a conventional screw valve structure to regulate fluid/gas ingress and egress; when in the open position the chamber defined by the opposing panels is exposed to the environment, and when in the closed position the chamber is isolated from the environment. Thus, a user wanting to permit the inflatable body to expand from a compressed state would merely open the valve if the body was of the self-inflating type, permit the chamber to equalize with the environment, and then close the valve so that the chamber volume would remain constant regardless of the compression or pressure state of the body.

Cushion 10 differs from such self-inflating bodies in that there is not necessarily an external means for isolating the cushion chamber from the environment, although such external closure means is within the scope of the invention. Instead, internal means are provided to selectively obstruct the fluid conduit between the chamber and the environment that is defined by valve assembly 30.

Valve assembly 30 comprises vent body 40, elongate member 60 and a compression member (which in the singular requires the presence of a reactive surface, and in the plural, i.e., "pair", intrinsically includes the reactive surface), generically referred to as compression member 70. Referring first to vent body 40, outer flange 42, which may be constructed from a plastic or similar material, serves as the interface with panels 12a and 12b. Thus, if panels 12a and 12b are sealed as previously described, and surround outer flange 42 as shown best in FIG. 1, then a rigid structure exists between the inner chamber and the environment.

Figure 2:
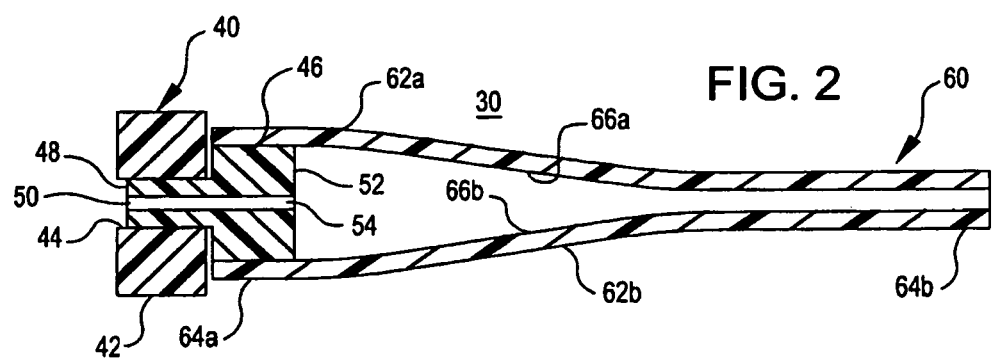
FIG. 2 is a cross section side elevation view of the valve assembly of FIG. 1.
Figure 3:
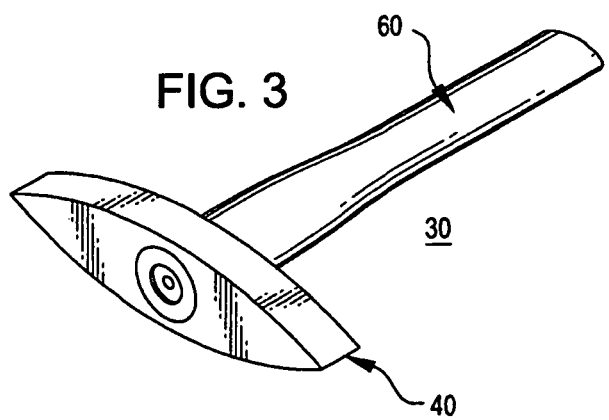
FIG. 3 is a detailed perspective view of the valve assembly of FIG. 1.

Referring primarily to FIGS. 2 and 3, vent body 40 further comprises inner orifice 44 into which bushing 46 is inserted. Bushing 46 is preferably constructed from a plastic that is the same as or compatible with that used for outer flange 42. Those persons skilled in the art will of course realize that bushing 46 can be integral with outer flange 42, e.g., resulting from a single manufacturing process such as injection molding. Bushing 46 includes first end 48, a face portion of which defines outer orifice 50, second end 52, a face portion of which defines inner orifice 54, and further defines conduit 56.

While first end 48 is sized to fit within inner orifice 44 of outer flange 42, second end 52 is sized to externally receive proximal end 64a of elongate member 60. Elongate member 60 is preferably constructed from a resilient material that will predictably deform upon application of suitable opposing mechanical forces and recover its resting state shape upon removal of such forces. Because elongate member 60 is a hollow body, the internal surface thereof may be treated, coated, or subject to lamination with materials that enhance the performance and/or operating characteristics of the body. Thus, elongate member 60 may be constructed from suitable thin wall PVC while inner surface 66 has a urethane layer to establish a resilient seal when elongate member 60 is subject to contacting compression.

Elongate member 60 preferably has an elliptical cross section extending from distal end 64b towards proximal end 64a. This geometry, where the minor axis is in the vertical direction when cushion 10 is in use, facilitates collapse of elongate member 60 as will be described below.

Figure 4:
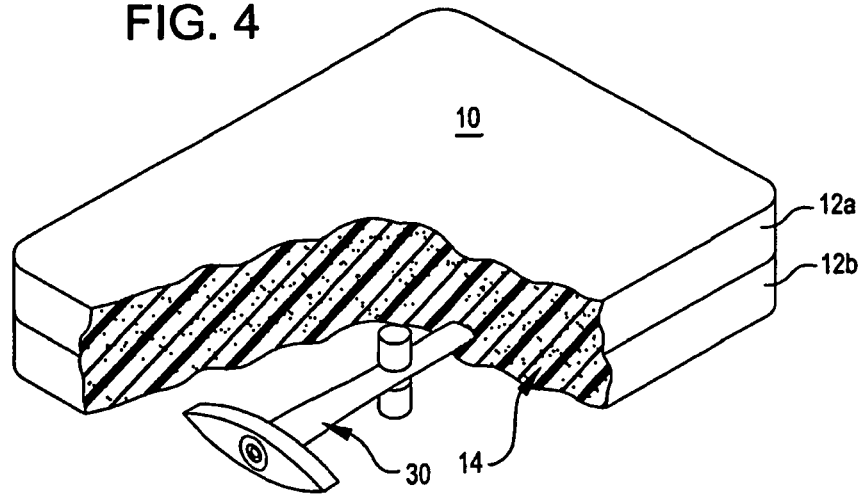
FIG. 4 is a perspective view, in partial cut away, of the valve assembly embodiment of FIG. 1 shown with a second inflatable body embodiment having opposing compression members in the form of opposing compression members or foam "pistons"
Figure 5:
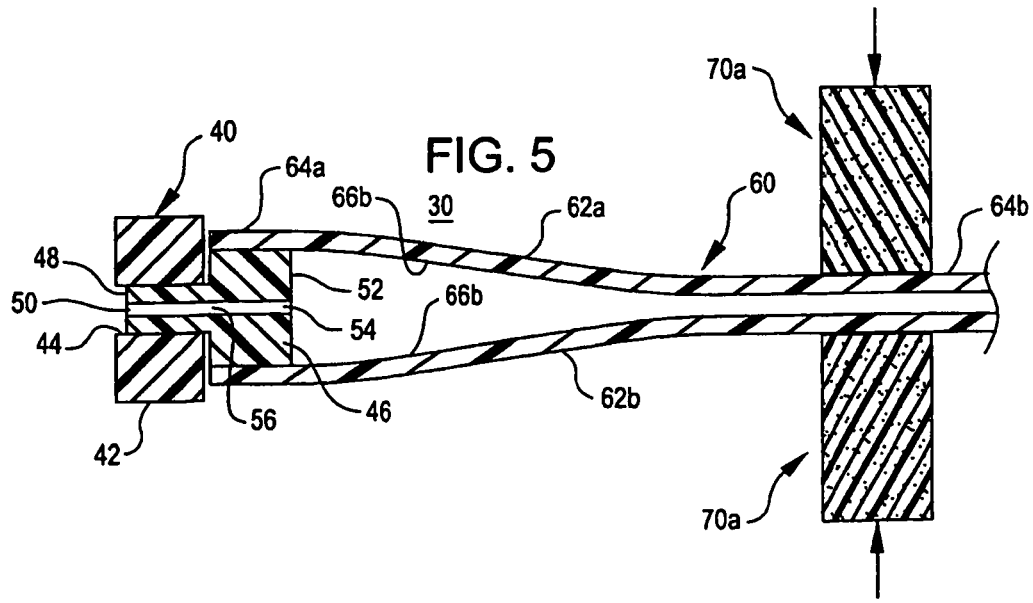
FIG. 5 is a cross section side elevation view of the valve assembly and opposing compression members of FIG. 4.

A feature of the invention is the ability to internally modulate fluid flow into and out of the cushion chamber. Embodiments of the invention achieve this function by using at least one compression member 70 to act on elongate member 60; when a sufficient compressive force acts on a portion of elongate member 60, opposing sides of inner surface 66 contact each other, thereby establishing a seal (presuming that the contact is continuous along the minor axis of the member, or along the major axis of the ellipse if contact takes place with respect to such a structure, and that if only one compression member is used, that there is an oppositely located reactive surface). In the illustrated embodiment of FIGS. 4 and 5, opposing compression members 70a are identical to each other, but are placed in mirrored opposition relative to elongate member 60.

Any compression member 70 may be constructed from a material or materials particularly suited for a given application, however, in the illustrated embodiments, a foam material having a higher density and/or Indentation Force Deflection ("IFD") value than core 14 is used, and as will be detailed below, may also comprise various additional structure to enhance its function. Each compression member in the illustrated embodiment is disposed in a hole or hollow cylinder of the core to form a "sleeve", much as a piston resides in a sleeve when describing a reciprocating piston engine. However, the skilled artisan will appreciate the myriad modes in which the compression of the elongate member can be achieved including, but not limited to, compression members that do not extend to the outer surface(s) of the core, composite compression members, rigid structures imbedded in the core, hinged or scissored structures encompassing the elongate member, etc.

In the illustrated embodiment, each compression member 70a acts as a piston such that when subjected to generally compressive mechanical force, compression members 70a translate within their respective "sleeves", which are defined by core 14, as will be described in greater detail below. The adductive movement of both compression members 70a cause a localized collapse of elongate member 60 at upper surface 62a and lower surface 62b, which, as described previously, causes inner surfaces 66a and 66b to contact each other and thereby isolate the chamber from the environment. Once the opposing compressive force has been removed, the inherent resiliency of elongate member 60 and/or core 14, by virtue of friction inherent between its surfaces defining the "sleeves" and the outer surface of each compression member, cause the destruction of the seal between inner surfaces 66a and 66b of elongate member 60. Of course, different forms of compression members may employ alternative or additive restorative biases to those existing in a particular embodiment, e.g., a hinged compression member may incorporate a rotational opening bias to the arms that extend from the hinge.

Figure 6:
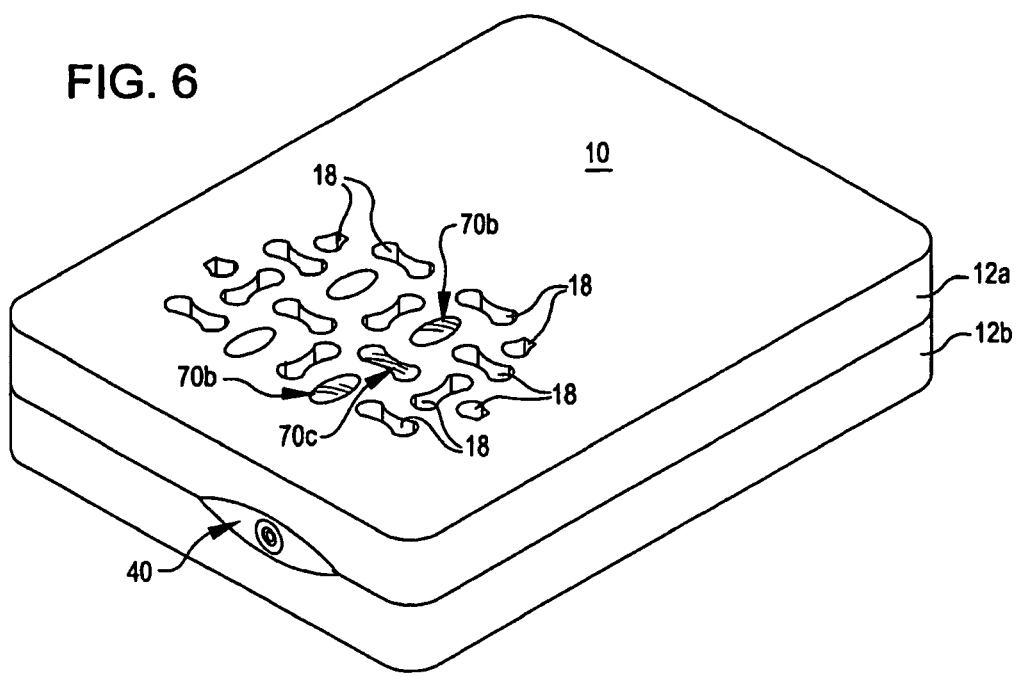
FIG. 6 is a plan view of a third inflatable body embodiment showing a plurality of through-cuts or holes to modify the Indentation Force Deflection values about the seated area of the body, as well as the off-axis location of a plurality of compression members.
Figure 7:
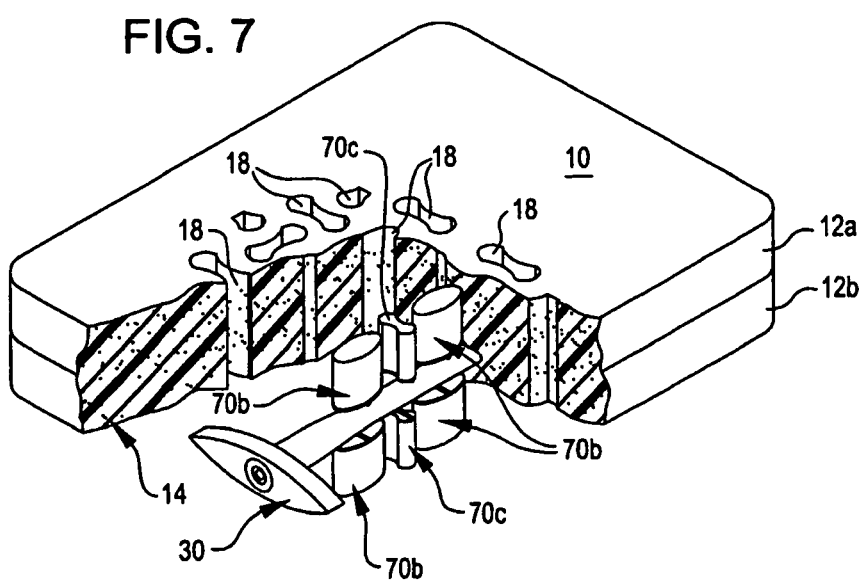
FIG. 7 is a perspective cut-away view of the embodiment of FIG. 6.

A robust embodiment of the invention is shown in FIGS. 6 and 7 wherein a plurality of core holes 18 are formed in core 14 to alter the IFD values of the cushion in certain areas to properly accommodate a user. Holes 18 are preferably formed by die cutting core 14 such that they penetrate from one surface of core 14 to the opposing surface, although thru-holes are not necessary. The curvilinear geometric forms in a non-matrix format are selected to provide relatively consistent wall thicknesses and distribute localized stresses that would otherwise build and potentially cause unintended separation of panels 12 from core 14. Those persons skilled in the art will appreciate that there are a myriad of ways of altering the IFD values of such a cushion, such as creating a composite core having a plurality of discrete portions filtered or glued to each other, material shaping, selective adhesion of panels 12, etc. Such IFD modification is not necessary to operation of the disclosed embodiments, but is considered desired from an end user perspective. Moreover, a reduced IFD value at or adjacent to compression members 70 increases the effectiveness of the same.

At least one hole 18 having opposing openings is fitted with a pair of compression members. In the illustrated embodiment, compression members 70b and 70c are used. Each compression member includes upper proximal end 72, which is nearest elongate member 60, and distal end 74. Compression members 70b and 70c are located in holes 18 that are not at the centerline of cushion 10 to take advantage of the greater loading that occurs off center due to pelvic/buttocks and femur/leg contact during use of the cushion.

To ensure the functioning of valve assembly 30, multiple compression members are used along the longitudinal axis of elongate member 60. Consequently, cushion 10 remains viable for users of differing sizes and postures. Moreover, the compressive effectiveness of each member 70 may be modified to take into account such variables, as the case may be.

Figure 8:
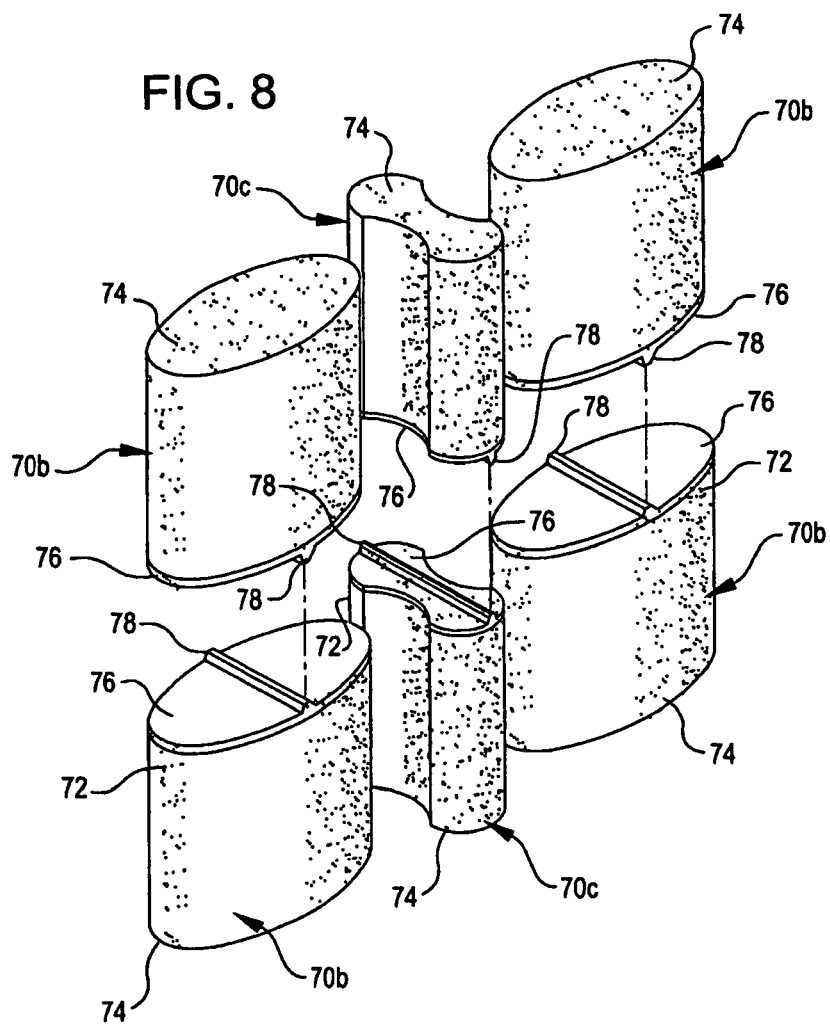
FIG. 8 is an isolated perspective view of the compression members of FIG. 6, particularly detailing the presence of a compression localizing disc and ridge arrangement at the proximal ends of the compression members.

To enhance the closure effect of compression members 70b and 70c, proximal end 72 of each member includes polyethylene disc 76 having transverse rib 78 formed thereon, as is best shown in FIG. 7 and particularly FIG. 8. These ribs or ridges further localize the compression force and effect a better seal at elongate member 60. While not shown, alternative embodiments provide for multiple ribs one each disc to further increase the crimping effect that results from opposed mechanical compression of compression members equipped with this feature.

What is claimed:

1. An intra chamber valve assembly for use with an inflatable body defining a fluid impermeable, pressurizable chamber and an orifice for exposing the chamber to an ambient environment, the assembly comprising:

a vent body having an external orifice for exposure to the ambient environment, an internal orifice for presenting to the chamber and in fluid communication with the external orifice, and an inflatable body interface adapted to sealingly occupy the inflatable body orifice;

a collapsible, hollow elongate member having a proximal end extending from the internal orifice of the vent body and terminating at a distal end, wherein air directly travels a straight through path from the external orifice to the distal end; and a first compression member oriented about the elongate member at a first location in such a manner so as to sealingly collapse the elongate member upon presentation of a sufficient mechanical force thereat, wherein the elongate member is wholly disposed within the chamber defined by the inflatable body when the valve assembly is associated therewith.

2. The valve assembly of claim 1 wherein the first compression member is in contact with the elongate member prior to the presentation of a mechanical force.

3. The valve assembly of claim 1 wherein the elongate member comprises a coating on an inner surface thereof to facilitate the formation of a seal when opposing inner surfaces contact each other.

4. The valve assembly of claim 1 wherein the elongate member has an elliptical cross section at the first location.

5. The valve assembly of claim 1 wherein the first compression member comprises an expanded foam.

6. The valve assembly of claim 1 further comprising a second compression member generally opposite the first compression member to form a compression member pair.

7. The valve assembly of claim 1 wherein the first compression member comprises a force localizing feature on a proximal end thereof to increase the pressure per unit area when impinging upon the elongate member.

8. The valve assembly of claim 6 further comprising a plurality of compression member pairs arranged longitudinally along the elongate member.

9. The valve assembly of claim 8 wherein at least some of the plurality of compression member pairs have different IFD values.

10. The valve assembly of claim 8 wherein at least some of the plurality of compression member pairs comprise a force localizing feature on a proximal end thereof to increase the pressure per unit area when impinging upon the elongate member.

11. The valve assembly of claim 1 wherein the elongate member defines a single orifice at the distal end thereof and a single orifice at the proximal end thereof, which is coupled to the internal orifice of the Vent body.

12. A self-inflatable body defining a chamber filled with a resilient core of material and an orifice for exposing the core to the environment, wherein an immersion valve assembly extends into the chamber from the orifice, the valve assembly comprising:
a vent body having an external orifice exposed to the environment, an internal orifice presenting to the chamber and in fluid communication with the external orifice, and an inflatable body interface sealingly occupying the inflatable body orifice;
a collapsible, hollow elongate member having a proximal end extending from the internal orifice of the vent body and terminating at a distal end, wherein air directly travels a straight through path from the external orifice to the distal end; and
a first compression member oriented about the elongate member at a first location in such a manner so as to sealingly collapse the elongate member upon presentation of a sufficient mechanical force thereat, wherein the elongate member is wholly disposed within the chamber defined by the inflatable body.

13. The self-inflatable body of claim 12 wherein the first compression member is in contact with the elongate member prior to the presentation of a mechanical force.

14. The self-inflatable body of claim 12 wherein the elongate member comprises a coating on an inner surface thereof to facilitate the formation of a seal when opposing inner surfaces contact each other.

15. The self-inflatable body of claim 12 wherein the elongate member has an elliptical cross section at the first location.

16. The self-inflatable body of claim 12 wherein the first compression member comprises an expanded foam.

17. The self-inflatable body of claim 12 further comprising a second compression member generally opposite the first compression member to form a compression member pair.

18. The self-inflatable body of claim 12 wherein the first compression member comprises a force localizing feature on a proximal end thereof to increase the pressure per unit area when impinging upon the elongate member.

19. The self-inflatable body of claim 17 further comprising a plurality of compression member pairs arranged longitudinally along the elongate member.

20. The self-inflatable body of claim 12 wherein the elongate member is wholly surrounded by the resilient core of material in the chamber.

21. An intra chamber valve assembly for use with an inflatable body defining a fluid impermeable, pressurizable chamber and an orifice for exposing the chamber to an ambient environment, the assembly comprising:
a vent body having an external orifice for exposure to the ambient environment, an internal orifice for presenting to the chamber and in fluid communication with the external orifice, and an inflatable body interface adapted to sealingly occupy the inflatable body orifice;
a collapsible, hollow elongate member having a proximal end extending from the internal orifice of the vent body and terminating at a distal end; and
a first compression member proximate to the elongate member at a first location to sealingly collapse the elongate member upon presentation of a sufficient mechanical force thereat, wherein the elongate member is wholly disposed within the chamber defined by the inflatable body when the valve assembly is associated therewith, and is fluid impervious at the first location.

22. A self-inflatable body defining a chamber substantially filled with a resilient core of material and an orifice for exposing the core to the environment comprising the valve assembly of claim 21.

23. A self-inflatable body defining a chamber filled with a resilient core of material and an orifice for exposing the core to the environment, wherein an immersion valve assembly extends into the chamber from the orifice, the valve assembly comprising:
a vent body having an external orifice exposed to the environment, an internal orifice presenting to the chamber and in fluid communication with the external orifice, and an inflatable body interface sealingly occupying the inflatable body orifice;
a collapsible, hollow elongate member having a proximal end extending from the internal orifice of the vent body and terminating at a distal end, wherein the elongate member is wholly disposed within, but is physically separate from, the structure defining the chamber of the inflatable body; and
a first compression member oriented about the elongate member at a first location in such a manner so as to sealingly collapse the elongate member upon presentation of a sufficient mechanical force thereat.

24. The self-inflatable body of claim 23 wherein the first compression member is physically separate from the chamber defining structure of the inflatable body.

* * * * *